(12) United States Patent
Matsumura

(10) Patent No.: US 10,054,178 B2
(45) Date of Patent: Aug. 21, 2018

(54) DISC BRAKE

(71) Applicant: HITACHI AUTOMOTIVE SYSTEMS, LTD., Ibaraki (JP)

(72) Inventor: Sadatomo Matsumura, Ibaraki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/317,556

(22) PCT Filed: Apr. 8, 2015

(86) PCT No.: PCT/JP2015/060960
§ 371 (c)(1),
(2) Date: Dec. 9, 2016

(87) PCT Pub. No.: WO2015/198682
PCT Pub. Date: Dec. 30, 2015

(65) Prior Publication Data
US 2017/0114851 A1 Apr. 27, 2017

(30) Foreign Application Priority Data

Jun. 25, 2014 (JP) ................................. 2014-130237

(51) Int. Cl.
*F16D 66/02* (2006.01)
*F16D 55/224* (2006.01)
*F16D 65/00* (2006.01)

(52) U.S. Cl.
CPC ......... *F16D 66/028* (2013.01); *F16D 55/224* (2013.01); *F16D 65/0068* (2013.01)

(58) Field of Classification Search
CPC ............................... F16D 66/02; F16D 66/028
(Continued)

(56) References Cited

U.S. PATENT DOCUMENTS 3,282,241 A * 11/1966 Forbush ................ F16D 65/565
116/67 R
4,280,594 A * 7/1981 Baum ................... F16D 66/025
188/1.11 W
(Continued)

FOREIGN PATENT DOCUMENTS

JP 58-211034 12/1983
JP 2000-65108 3/2000
(Continued)

*Primary Examiner* — Thomas J Williams
(74) *Attorney, Agent, or Firm* — Wenderoth, Lind & Ponack, L.L.P.

(57) ABSTRACT

A disk brake includes a mounting member (2) having a pair of arms (2A) formed to extend over the outer periphery of a disk (1), the mounting member being secured to a non-rotating part of a vehicle, a caliper (3) provided on the mounting member (2) movably in the axial direction of the disk (1), a pair of pin holes (2C) provided in the arms (2A), respectively, of the mounting member (2) to extend in the axial direction of the disk (1), a pair of sliding pins (6) provided at the opposite ends of the caliper (3) to slide in the pin holes (2C), respectively, and a pair of pads (10) movably attached to the mounting member (2) and pressed against the opposite sides, respectively, of the disk (1) by the caliper (3). At least one arm (2A) of the arms (2A) of the mounting member (2) is provided with a warning sound generating mechanism (13) generating a warning sound for wear detection according to displacement of the sliding pin (6) relative to the arm (2A) when the pads (10) have worn by a predetermined amount.

7 Claims, 11 Drawing Sheets

(58) Field of Classification Search
USPC .................. 188/1.11 L, 1.11 W, 73.44, 73.45
See application file for complete search history.

(56) References Cited

U.S. PATENT DOCUMENTS

| | | | | |
|---|---|---|---|---|
| 5,687,817 | A | * | 11/1997 | Kobayashi ............ F16D 65/097 |
| | | | | 188/72.3 |
| 5,934,417 | A | | 8/1999 | Kobayashi et al. |
| 6,272,914 | B1 | | 8/2001 | Ciotti |
| 6,481,539 | B1 | * | 11/2002 | Shaw ................ F16D 55/22655 |
| | | | | 188/1.11 E |
| 6,637,262 | B2 | * | 10/2003 | Chang ........................ G01L 5/28 |
| | | | | 188/11 |

FOREIGN PATENT DOCUMENTS

| | | |
|---|---|---|
| JP | 3273436 | 4/2002 |
| JP | 2007-198525 | 8/2007 |

* cited by examiner

DISC BRAKE

TECHNICAL FIELD

The present invention relates to disk brakes applying braking force to a vehicle.

BACKGROUND ART

There is a technique in which a caliper of a disk brake is provided with a sensor detecting wear of pads, and the driver is informed of the wear of the pads (time for replacement) through an indicator connected to the sensor (see, for example, Patent Literature 1).

CITATION LIST

Patent Literature

Patent Literature 1: Japanese Patent Laid-Open Publication No. 2000-65108

SUMMARY OF INVENTION

According to Patent Literature 1, the wear of the pads is electrically detected with the sensor; therefore, the conventional disk brake has the problem that the cost is increased.

An object of the present invention is to provide a disk brake capable of informing the driver of the wear of the pads at a reduced cost.

To solve the above-described problem, the present invention provides a disk brake including a counting member having a pair of arms formed to extend over the outer periphery of a disk, the counting member being secured to a non-rotating part of a vehicle, a caliper provided on the mounting member movably in the axial direction of the disk, a pair of pin holes provided in the arms, respectively, of the mounting merger to extend in the axial direction of the disk, a pair of sliding pins provided at the opposite ends of the caliper to slide in the pin holes, respectively, and a pair of pads movably attached to the mounting member and pressed against the opposite sides, respectively, of the disk by the caliper.

Further, at least one arm of the arms of the mounting member is provided with a warning sound generating mechanism generating a warning sound for wear detection according to displacement of the sliding pin relative to the arm when the pads have worn by a predetermined amount.

According to the present invention, it is possible to provide a disk brake capable of informing the driver of the wear of the pads at a reduced cost.

DESCRIPTION OF EMBODIMENTS

Disk brakes according to embodiments of the present invention will be explained below in detail with reference to the accompanying drawings.

Figure 1:
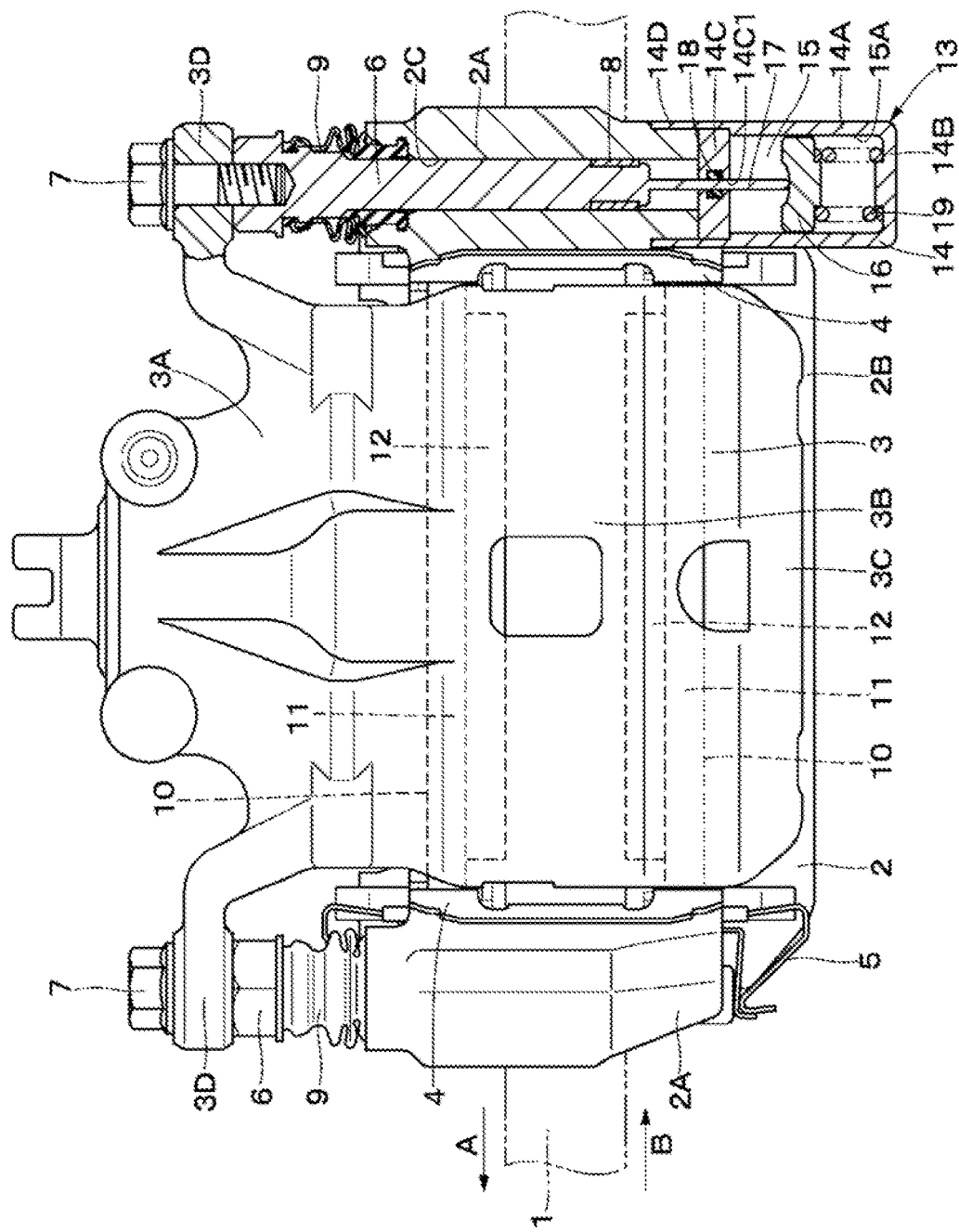
FIG. 1 is a plan view of a disk brake according to a first embodiment of the present invention.
Figure 2:
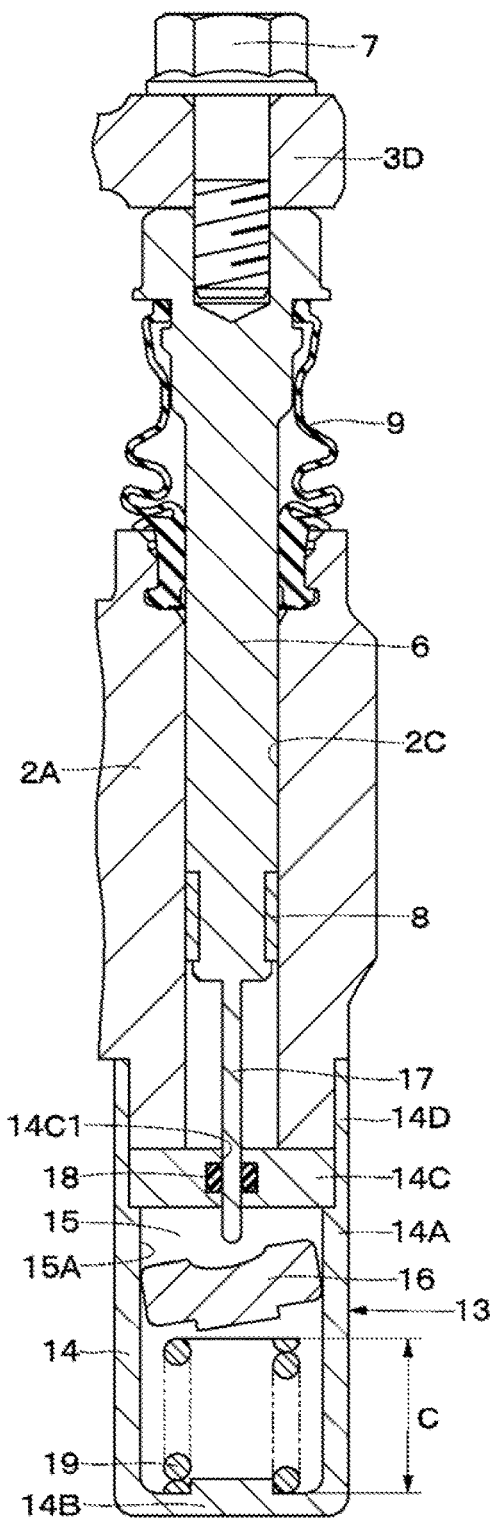
FIG. 2 is an enlarged sectional view showing an arm, a sliding pin, and a warning sound generating mechanism when the brake is activated in a state where pads have worn out.

FIGS. 1 and 2 show a first embodiment of the present invention. A disk 1 shown in FIG. 1 rotates together with a wheel (not shown) of a vehicle. For example, when the vehicle runs in the forward direction, the disk 1 rotates in the direction of the arrow A in FIG. 1, and when the vehicle reverses, the disk 1 rotates in the direction of the arrow B in FIG. 1.

A mounting member 2 is secured to a non-rotating part of the vehicle. The mounting member 2 includes a pair of arms 2A spaced apart from each other in the rotational (circumferential) direction of the disk 1 and extending over the outer periphery of the disk 1 in the axial direction or the disk 1. The mounting member 2 further includes a thick-walled support portion (not shown) provided to integrally connect together the proximal ends of the arms 2A and secured to the non-rotating part of the vehicle at a position on the inner side of the disk 1.

Further, the mounting member 2 is formed with a reinforcing beam 2B connecting together the distal ends of the arms 2A at a position on the outer side of the disk 1. Thus, the arms 2A of the counting member 2 are integrally connected together by the above-described support portion at the inner side of the disk 1, and at the outer side of the disk the arms 2A are integrally connected together by the reinforcing beam 2B. In addition, the arms 2A are provided with pin holes 2C, respectively, extending in the axial direction of the disk 1. The pin holes 2C have sliding pins 6 slidably fitted therein, respectively.

Each arm 2A of the mounting member 2 has a disk pass portion (not shown) in the middle thereof in the direction of the disk 1. The disk pass portion extends arcuately along the outer periphery (locos of rotation) of the disk 1. The mounting member 2 has inner- and outer-side pad guides (not shown) formed at the opposite sides of the disk pass portion (i.e. at the opposite sides in the axial direction of the disk 1). Each pad guide is forced as a U-groove having a U-shaped sectional configuration and extends in the direction in which the associated pad 10 is slidingly displaced, i.e. in the axial direction of the disk 1.

A caliper 3 is provided on the mounting member 2 movably in the axial direction of the disk 1. The caliper 3 has, as shown in FIG. 1, an inner leg portion 3A provided at the inner (one) side of the disk 1, a bridge portion 3B extending from the inner leg portion 3A to the outer (other) side of the disk 1 over the outer periphery of the disk 1 between the arms 2A of the mounting member 2, an outer leg portion 3C extending radially inward of the disk 1 from the outer-side (distal) end of the bridge portion 3B, and two pin-mounting portions 3D projecting sideward, from the inner leg portion 3A toward the mutually opposite sides.

The inner leg portion 3A of the caliper 3 is formed with a cylinder (not shown) in which a piston (not shown) is slidably fitted. The pin-mounting portions 3D allow the whole caliper 3 to be slidably supported by the arms 2A of the mounting member 2 through the sliding pins 6.

Pad springs 4 axe disposed between the arras 2A of the mounting member 2 and the pads 10 and attached to the arms 2A, respectively. The pad springs 4 resiliently support the inner- and outer-side pads 10 therebetween and allow smooth sliding displacement of the pads 10.

Return springs 5 are provided between the arm 2A located at the exit side (rotation exit side) of the rotational direction of the disk 1 rotating in the direction of the arrow A and the pads 10 to urge the inner- and outer-side pads 10 in respective return directions away from the disk 1. Each return spring 5 is secured at one end in the longitudinal direction thereof to a backing plate 11 of the associated pad 10. The other end in the longitudinal direction of the return spring 5 is brought into abutting contact with a part of the mounting member 2 in an elastically deformed state. The return springs 5 have a spring constant greater than that of a coil spring 19. Consequently, when the brake is released, the pads 10 can be separated from the disk 1 stably.

The sliding pins 6 are, as shown in FIG. 1, fastened to the pin-mounting portions 3D of the caliper 3 by using bolts 7, respectively. The distal ends of the sliding pins 6 extend toward the respective pin holes 2C in the arms 2A of the mounting member 2, and are slidably fitted in the pin holes 2C of the mounting member 2. In this case, the sliding pins 6 slidingly move toward the inner side when the brake of the vehicle is activated, thus causing the whole caliper 3 to be slidingly displaced toward the inner side relative to the arms 2A of the mounting member 2.

Each sliding pin 6 has a circular cylindrical bush 8 provided around the outer periphery of the distal end thereof. The bush 8 is formed by using, for example, a rubber or synthetic resin material having a high wear resistance. The bush 8 has an outer diameter corresponding to the inner diameter of the pin hole 2C. The bush 8 suppress leakage, into a hollow portion 15, of grease (lubricant) used to allow the sliding pin 6 to smoothly slide in the pin hole 2C. In addition, the hush 8 is in sliding contact with the wall of the pin hole 2C, thereby suppressing rattling or the like of the sliding pin 6 in the pin hole 2C. In addition, the sliding pin 6, has a projection 17 provided at the distal end thereof.

Protective boots 9 are provided between the arms 2A and the sliding pins respectively. The protective boots 9 are each formed in the shape of a bellows-shaped cylindrical member by using an elastic material, e.g. rubber. Each protective boot 9 protects the sliding surfaces of the pin hole 2C and the sliding pin 6. The protective boot 9 is in elastically sliding contact with the outer periphery of the sliding pin, thereby suppressing rattling or the like of the sliding pin 6 in the pin hole 2C.

The inner-side pad 10 and the outer-side pad 10 are disposed to face the opposite sides, respectively, of the disk 1. Each pad 10 comprises a flat plate-shaped backing plate 11 extending substantially in a fan shape along the rotational (circumferential) direction of the disk 1, and a lining 12 (see FIG. 1) fixed to the obverse surface of the backing plate 11 to serve as a friction material brought into frictional contact with the obverse surface of the disk 1.

The backing plate 11 of each pad 10 has projection-shaped lug portions (not shown) provided on the opposite sides thereof in the rotational direction of the disk 1. The lug portions are fitted into the pad guides of the mounting member 2 in a recess-projection fitting manner. Thus, the pads 10 are movable in the axial direction of the disk 1.

Next, the warning sound generating mechanism used in this embodiment will be explained.

The warning sound generating mechanism 13 is provided in the arm 2A of the pair of arms 2A of the mounting member 2 that is located at the entrance side (rotation entrance side) of the rotational direction of the disk 1. The warning sound generating mechanism 13 is disposed at a position spaced from the pin hole 2C in the direction of movement of the sliding pin 6, which slides in the pin hole 2C. The warning sound generating mechanism 13 generates a warning sound for wear detection according to displacement of the sliding pin 6 when the pads 10 (linings 12) have worn by a predetermined amount (when the pads 10 have reached their wear limit). The warning sound generating mechanism 13 comprises a casing 14, a hollow portion 15, a warning sound generating member 16, a projection 17, and a coil spring 19.

The casing 14 is provided at the outer-side end of the arm 2A and constitutes a part of the arm 2A. The casing 14 is formed in the shape of a bottomed cylinder by using a metal material, e.g. aluminum, or a rigid resin material, for example. The casing 14 comprises a cylindrical portion 14A constituting the outer shell of the hollow portion 15, a bottom portion 14B closing the outer-side end of the cylindrical portion 14A, a cap portion 14C facing the bottom portion 14B and closing the inner-side end (opening-side end) of the cylindrical portion 14A, and a mounting portion 14B extending from the opening-side end of the cylindrical portion 14A toward the inner side and secured to the outer-side end of the arm 2A.

Regarding the thickness thereof, the cylindrical portion 14A is formed as thin as possible so that a large warning sound can be generated when the warning sound generating member 16 collides with the cylindrical portion 14A. The bottom portion 14B is provided with a coil spring 19. The cap portion 14C caps the inner-side end of the hollow portion 15 and is provided in the center thereof with a through-hole 14C1 through which the projection 17 extends. The casing 14 is integrally secured to the arm 2A by fitting, press-fitting or screwing the mounting portion 14D to the outer-side end of the arm 2A.

The hollow portion 15 is formed in the casing 14. Specifically, the hollow portion 11 is defined by the cylindrical portion 14A, bottom portion 14B and cap portion 14C of the casing 14 and extends in the axial direction of the disk 1 in series to the pin hole 2C. That is, the hollow portion 15 is provided in the arm 2A at a position different from the pin hole 2C in the direction of movement of the sliding pin 6. The hollow portion 15 is a space for warning sound generation in which a warning sound is generated by the collision of the warning sound generating member 16 with an inner wall 15A of the hollow portion 15. It should be noted that the hollow portion 15 may be closed; alternatively, the inner wall 15A may be provided with a thin hole extending therethrough from the inside to the outside in order to make sound audible from the outside.

The warning sound generating member 16 is movably provided in the hollow portion 15. The warning sound generating member 16 is a solid body made of a metal material, e.g. aluminum, or a rigid resin material, for example. The warning sound generating member 16 has an outer diameter set smaller than the inner diameter of the casing 14 (bore diameter of the hollow portion 15). The projection 17 abuts against the inner-side end of the warning sound generating member 16, and the coil spring 19 is disposed at the outer-side end of the warning sound generating member 16.

When the brake of the vehicle is released (i.e. in a non-braking state), the projection 17 presses the warning sound generating member 16 against the coil spring 19, thereby restraining the warning sound generating member 16 from moving in the hollow portion 15. On the other hand, when the vehicle brake is activated when the pads 10 have reached their wear limit, the projection 17 cancels pressing of the warning sound generating member 16 against the coil spring 19. Consequently, the warning sound generating member 16 is allowed to collide with the inner wall 15A of the hollow portion 15, thereby generating a warning sound.

The projection 17 is integrally provided at the distal end (outer-side end) of the sliding pin 6. The projection 17 is formed in the shape of a rod having an outer diameter smaller than that of the sliding pin 6. The projection 17 extends from the distal end of the sliding pin 6 through the pin hole 2C and further extends through the through-hole 14C1 provided in the cap portion 14C of the casing 14 so that the distal end of the projection 17 projects into the hollow portion 15. Between the projection 17 and the through-hole 14C1 is provided a seal member 18 suppressing grease in the pin hole 2C from leaking into the hollow portion 15.

The warning sound generating member 16 is disposed at the distal end of the projection 17. Both when the vehicle brake is released and when the pads 10 have not worn out, the projection 17 holds the warning sound generating member 16 between itself and the coil spring 19 to restrain the warning sound generating member 16 from colliding with the inner wall 15A.

On the other hand, when the vehicle brake is activated when the pads 10 have reached their wear limit, the projection 17 removes the restraint on the warning sound generating member 16, which has been imposed by the projection 17 and the coil spring 19, thereby allowing the warning sound generating member 16 to collide with the inner wall 15A.

The coil spring 19, which serves as a resilient member, is provided in the hollow portion 15, with one end thereof fixed to the bottom portion 14B. The coil spring 19 resiliently supports the warning sound generating member 16. The coil spring 19 has a spring constant set so large that the warning sound generating member 16 as resiliently supported by the coil spring 19 cannot collide with the inner wall 15A in response to vibration or the like of the vehicle body, and the spring constant of the coil spring 19 is set smaller than that of the return springs 5. Thus, it is possible to suppress generation of a warning sound when the pads 10 have not worn out and also possible to separate the pads 10 from the disk 1 stably when the vehicle brake is released.

Further, the coil spring 19 resiliently supports the warning sound generating member 16 between itself and the projection 17 when the vehicle brake is released and when the pads 10 have not worn out, thereby restraining the warning sound generating member 16 from colliding with the inner wall 15A.

Meanwhile, the coil spring 19 has a natural length C corresponding to a length that the coil spring 19 has when the pads 10 have reached their wear limit. That is, when the pads 10 have reached their wear limit, the coil spring 19 reaches its natural length as shown by the characteristics 20 of the coil spring 19, which is represented by the dotted line in FIG. 9.

In this case, when the vehicle brake is activated when the pads 10 have reached their wear limit, the coil spring 19 cancels the resilient support for the warning sound generating member 16, which has been provided by the coil spring 19 and the projection 17, thereby allowing the warning sound generating member 16 to collide with the inner wall 15A.

The following is an explanation of the operation of the disk brake according to this embodiment configured as stated above.

First, when the brake of the vehicle is activated, a brake fluid pressure is supplied into the inner leg portion 3A (cylinder) of the caliper 3, thereby causing the piston to be slidingly displaced toward the disk 1, whereby the inner-side pad 10 is pressed against one side of the disk 1. At this time, the caliper 3 receives pressing counterforce from the disk 1. Therefore, the whole caliper 3 is slidingly displaced toward the inner side relative to the arms 2A of the mounting member 2. Consequently, the outer leg portion 3C presses the outer-side pad 10 against the other side of the disk 1.

Thus, the inner- and outer-side pads 10 can strongly hold the disk 1 rotating in the direction of the arrow A in FIG. 1 (when the vehicle is running forward) therebetween from both sides in the axial direction of the disk 1, thereby applying braking force to the disk 1. When the braking operation is canceled, the supply of the fluid pressure to the piston is stopped. Consequently, the inner- and outer-side pads 10 are separated from the disk 1 to return to their non-braking positions by the resilient force of the return springs 5.

In this regard, the pads 10 wear gradually because the pads 10 apply braking force to the disk 1 by slidingly on the latter, and the worn pads 10 have to be replaced. According to Patent Literature 1, the wear of the pads is electrically defected with a sensor, and the driver is informed of the time for replacement of the pads. This conventional technique needs to dispose a sensor and electric components and therefore has the problem that the cost is increased.

As related conventional techniques configured to reduce the cost, there is known a technique in which a pad is provided with a vibrating member that generates a warning sound by contacting the disk when the pad has worn to a certain extent. Another known technique is such that when the pad has worn, to a certain extent, a friction member is exposed to contact the disk, thereby generating a warning sound. These conventional techniques involve the problem that pads to be assembled to disk brakes cannot be selected freely.

Under these circumstances, in this embodiment, one arm 2A of the mounting member 2 is provided with the warning sound generating mechanism 13 generating a warning sound when the pads 10 have worn out (at the time for replacement). The following is an explanation of the operation of the warning sound generating mechanism 13.

First, when the brake of the vehicle is released, the projection 17 is projected into the hollow portion 15 to a considerable extent from the through-hole 14C1, thereby causing the projection 17 to press the warning sound generating member 16 against the coil spring 13. Consequently, the warning sound generating member 16 is held (resiliently supported) between the projection 17 and the coil spring 19, thereby being restrained from colliding with the inner wall 15A (see FIG. 1).

Next, when the vehicle brake is activated, the projection 17, which is integrally provided at the distal end of the sliding pin 6, slidingly moves toward the inner side, together with the sliding pin 6. The clearance between the disk 1 and each pad 10 (pad clearance) is maintained substantially constant by a piston seal (not shown); therefore, the pad clearance does not change according to the degree of wear of the pads 10. However, as the pads 10 wear out, the amount of displacement (amount of sliding) of the sliding pin 6 and the projection 17 relative to the arm 2A increases. The amount of displacement of the sliding pin 6 and the projection 17 relative to the arm 2A has been set smaller than the amount of displacement at which the coil spring 19 reaches its natural length. In other words, it has been set so that the coil spring 13 reaches its natural length when the amount of displacement of the sliding pin 6 relative to the arm 2A reaches a predetermined amount of displacement from the position of the sliding pin 6 when the pads 10 are new, as a result of wearing of the pads 10. Accordingly, the warning sound generating member 16 is continuously held between the projection 17 and the coil spring 19 and therefore restrained from colliding with the inner wall 15A.

However, when the pads 10 have readied their wear limit, the thickness of the pads 10 has reduced. Accordingly, the amount of displacement of the sliding pin 6 and the projection 17 relative to the arm 2A increases. Here, the natural length C of the coil spring 19 has been set to correspond to the wear limit of the pads 10. Therefore, the amount of displacement of the sliding pin 6 and the projection 17 relative to the arm 2A becomes larger than the amount of displacement thereof when the coil spring 19 reaches its natural length.

Consequently, the warning sound generating member 16 is released from the pressure applied from the projection 17 and also released from the resilient support by the coil spring 19, thereby being allowed to move in the hollow portion 15. Thus, the warning sound generating member 16 collides with the inner wall 15A of the hollow portion 15 in response to vibration or the like of the vehicle body, thereby generating a warning sound (knocking sound). In this regard, the cylindrical portion 14A of the casing 14 is preferably reduced in thickness as much as possible so that a warning sound can be easily generated when the warning sound generating member 16 collides with the inner wall 15A.

Thus, according to this embodiment, the driver is informed of the wear of the pads 10 (time for replacement) by a warning sound from the warning sound generating mechanism 13 without electrically detecting the wear condition of the pads 10; therefore, the cost can be reduced.

Further, because the warning sound generating mechanism 13, which generates a warning sound when the pads 10 have worn out, is provided on the arm 2A of the mounting member 2, the pads 10 themselves need not be provided with a member for detecting the wear thereof. Consequently, it is possible to increase the number of types of pads 10 capable of being assembled to the mounting member 2 and hence possible for the driver to select from an extended range of pads 10. Accordingly, versatility can be increased. Further, when the pads 10 have worn out, the warning sound generating member 16 of the warning sound generating mechanism 13 generates a warning sound without using a friction-member that contacts the disk to generate a warning sound. Therefore, no damage will be done to the disk 1, and the lifetime of the disk 1 can be increased.

Further, the warning sound generating mechanism 13 is configured such that when the pads 10 have worn out, the warning sound generating member 16 generates a warning sound by colliding with the inner wall 15A of the hollow portion 15. Accordingly, the existing warning sound generating mechanism 13 can be used as it is when the worn pads 10 are replaced with new ones; therefore, the cost can be reduced.

Figure 3:
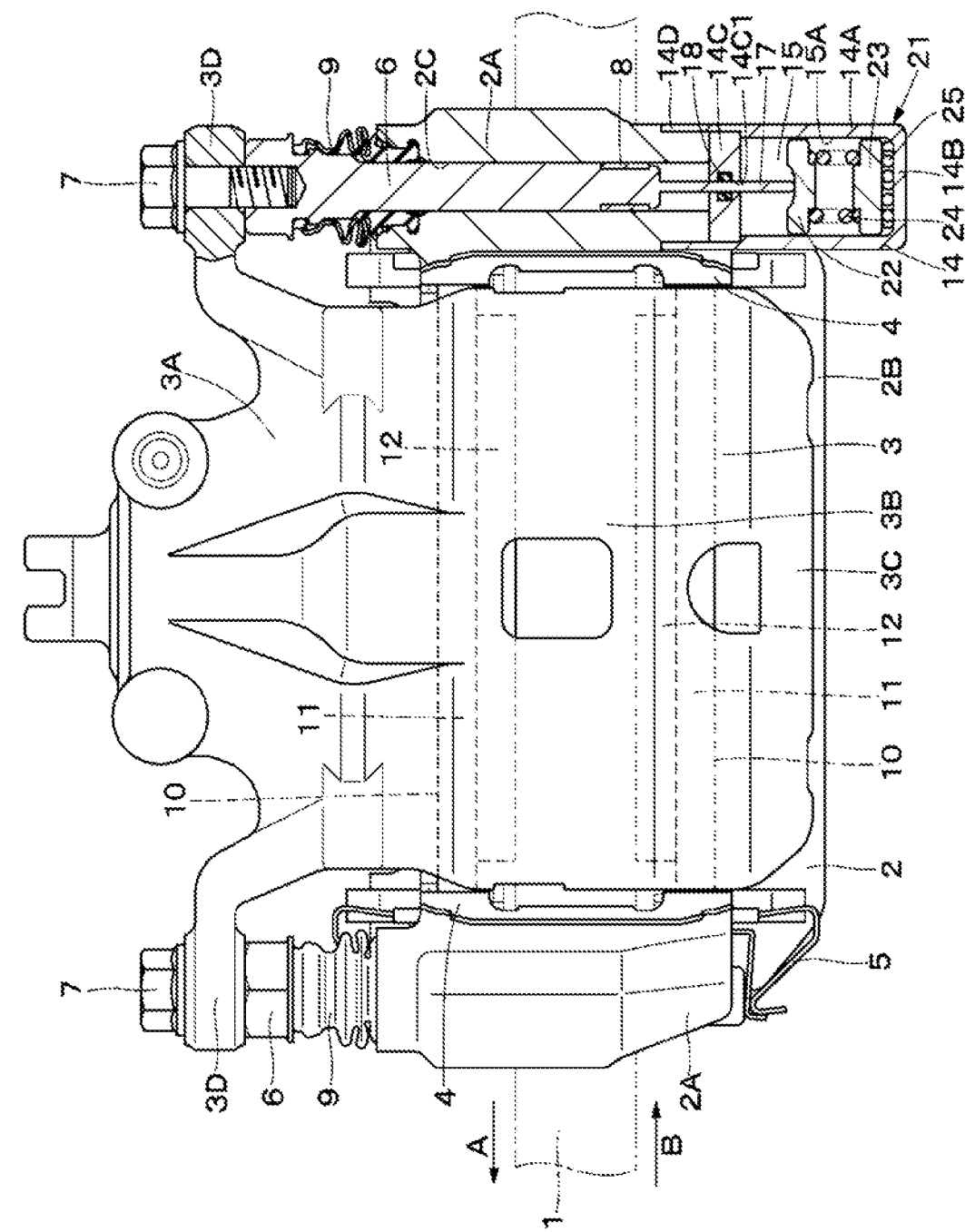
FIG. 3 is a plan view of a disk brake according to a second embodiment of the present invention.
Figure 4:
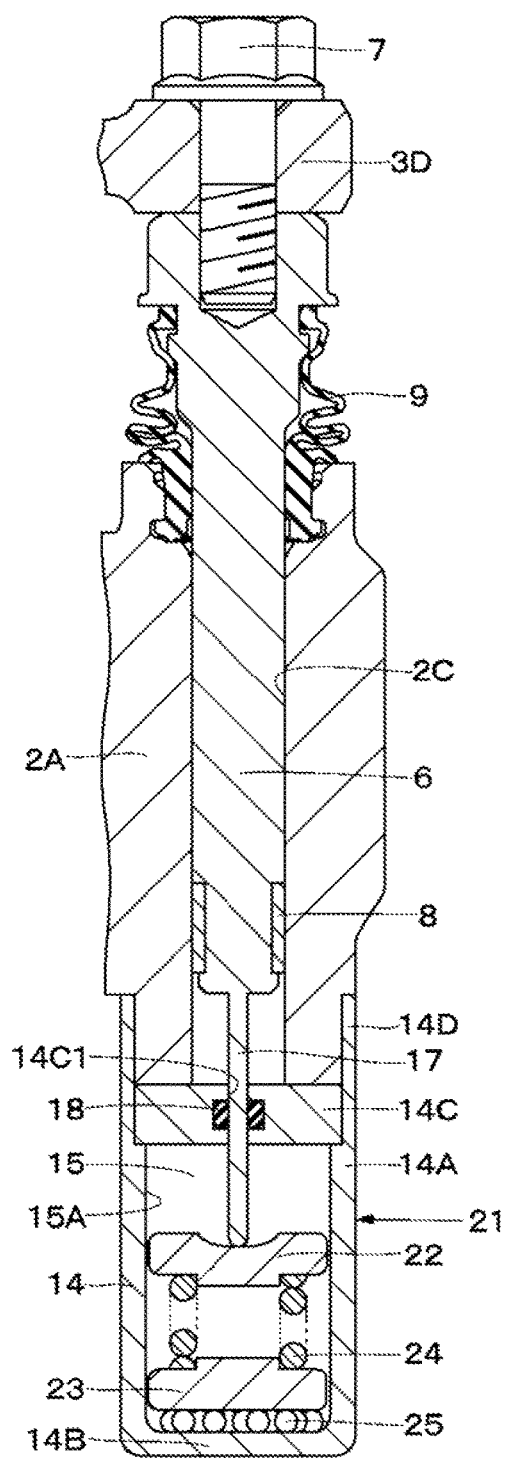
FIG. 4 is an enlarged sectional view showing an arm, a sliding pin, and a warning sound generating mechanism in FIG. 3.

FIGS. 3 and 4 show a second embodiment of the present invention. The second embodiment is characterized in that granular warning sound generating members are provided in the hollow portion of the warning sound generating mechanism, in addition to the warning sound generating member. It should be noted that, in the second embodiment, the same constituent elements as those of the first embodiment are denoted by the same reference numerals as those used in the first embodiment, and that a description thereof is omitted.

A warning sound generating mechanism 21 is provided in the arm 2A of the pair of arms 2A of the mounting member 2 that is located at the entrance side (rotation entrance side) of the rotational direction of the disk 1. The warning sound generating mechanism 21 is disposed at a position spaced from the pin hole 2C in the direction of movement of the sliding pin 6, which slides in the pin hole 2C. The warning sound generating mechanism 21 comprises a casing 14, a hollow portion 15, a projection 17, an inner-side warning sound generating member 22, an outer-side warning sound generating member 23, a coil spring 24, and granular warning sound generating members 25.

The inner-side warning sound generating member 22, which serves as a warning sound generating member, is movably provided in the hollow portion 15 at the inner side (side closer to the cap portion 14C) of the latter. The inner-side warning sound generating member 22 is a solid body made of a metal material, e.g. aluminum, or a rigid resin material, for example. The inner-side warning sound generating member 21 has an outer diameter set smaller than the inner diameter of the casing 14. The projection 17 abuts against the inner-side end of the inner-side warning sound generating member 22, and the coil spring 24 is disposed at the outer-side end of the inner-side warning sound generating member 22.

When the brake of the vehicle is activated when the pads 10 have reached their wear limit, the projection 17 cancels pressing of the inner-side warning sound generating member 22 against the coil spring 24. Consequently, the inner-side warning sound generating member 22 is allowed to collide with the inner wall 15A of the hollow portion 15, thereby generating a warning sound.

The outer-side warning sound generating member 23, which serves as a warning sound generating member, is movably provided in the hollow portion 15 at the outer side of the latter in such a manner as to face the inner-side warning sound generating member 22. The outer-side warning sound generating member 23 is a solid body made of a metal material, e.g. aluminum, or a rigid resin material, for example, in the same way as the inner-side warning sound generating member 22. The outer-side warning sound generating member 23 has an outer diameter set smaller than the Inner diameter of the casing 24. The coil spring 24 is disposed at the inner-side end of the outer-side warning sound generating member 23, and the granular warning sound generating members 25 abut against the outer-side end of the outer-side warning sound generating member 23.

When the vehicle brake is activated when the pads 10 have reached their wear limit, the projection 17 cancels pressing of the inner-side warning sound generating member 22 against the coil spring 24. Consequently, the outer-side warning sound generating member 23 is allowed to collide with the inner wall 15A of the hollow portion 15, thereby generating a warning sound.

The coil spring 24, which serves as a resilient member, is provided between the inner-side warning sound generating member 22 and the outers-side warning sound generating member 23 in the hollow portion 15. The coil spring 24 resiliently supports both the inner- and outer-side warning sound generating members 22 and 23.

The coil spring 24 has a spring constant set so large that the inner- and outer-side warning sound generating members 22 and 23 as resiliently supported by the coil spring 24 cannot collide with the inner wall 15A in response to vibration or the like of the vehicle body, and the spring constant of the coil spring 24 is set smaller than that of the return springs 5.

The granular warning sound generating members 25, which serve as warning sound generating members, are movably provided on the bottom portion 14B of the hollow portion 15. The granular warning sound generating members 25 are spheres made of a metal material, e.g. aluminum, or a rigid resin material, for example. A plurality of granular warning sound generating members 25 are provided, so that the outer-side warning sound generating member 23 can be placed on their inner-side ends in parallel to the bottom portion 14B.

Both when the vehicle brake is released and when the pads 10 have not worn out, the inner-side warning sound generating member 22 is pressed against the coil spring 24 by the projection 17, and the outer-side warning sound generating member 23 is pressed on the granular warning sound generating members 25 by the coil spring 24. The granular warning sound generating members 25 are held between the bottom portion 14B of the hollow portion 15 (casing 14) and the outer-side warning sound generating member 23. Thus, the inner- and outer-side warning sound generating members 22 and 23 and the granular warning sound generating members 25 are restrained from colliding with the inner wall 15A of the hollow portion 15.

On the other hand, when the pads 10 have reached their wear limit, the amount of displacement (amount of sliding) of the sliding pin 6 and the projection 17 becomes larger than the amount of displacement at which the coil spring 24 reaches its natural length. Consequently, the projection 17 separates from (moves out of abutment with) the inner-side warning sound generating member 22; therefore, the inner- and outer-side warning sound generating members 22 and 23 and the granular warning sound generating members 25 are allowed to move in the hollow portion 15. Thus, the inner- and outer-side warning sound generating members 22 and 23 and the granular warning sound generating members 25 collide with the inner wall 15A of the hollow portion 15 in response to vibration or the like of the vehicle body, thereby generating a warning sound (knocking sound).

Thus, with the warning sound generating mechanism 21 according to the second embodiment also, when the pads 10 have worn out, the inner- and outer-side warning sound generating members 22 and 23 and the granular warning sound generating members 25 can generate a warning sound by colliding with the inner wall 15A of the hollow portion 15. Therefore, the second embodiment can obtain the same advantages as those of the first embodiment.

Figure 5:
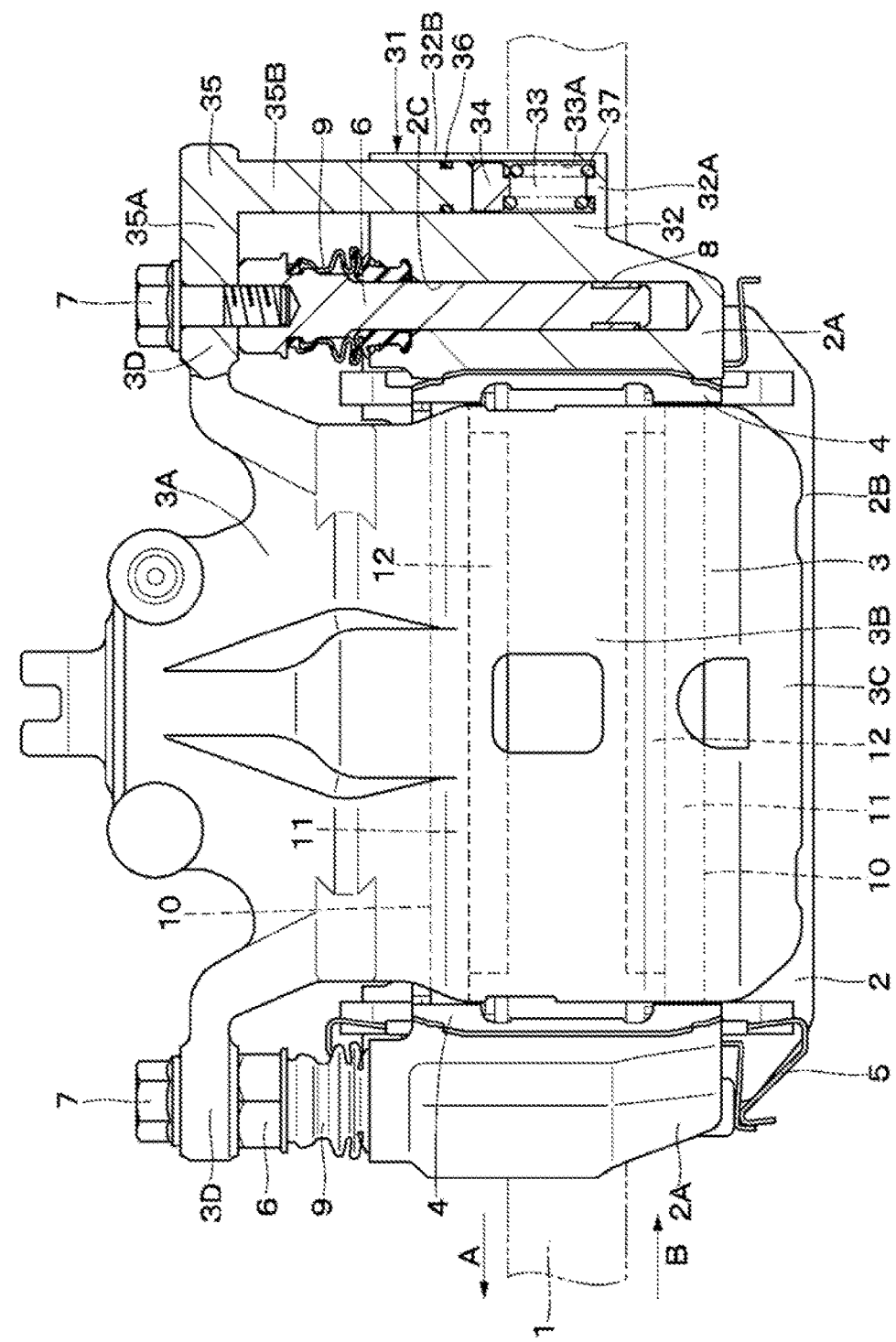
FIG. 5 is a plan view of a disk brake according to a third embodiment of the present invention.
Figure 6:
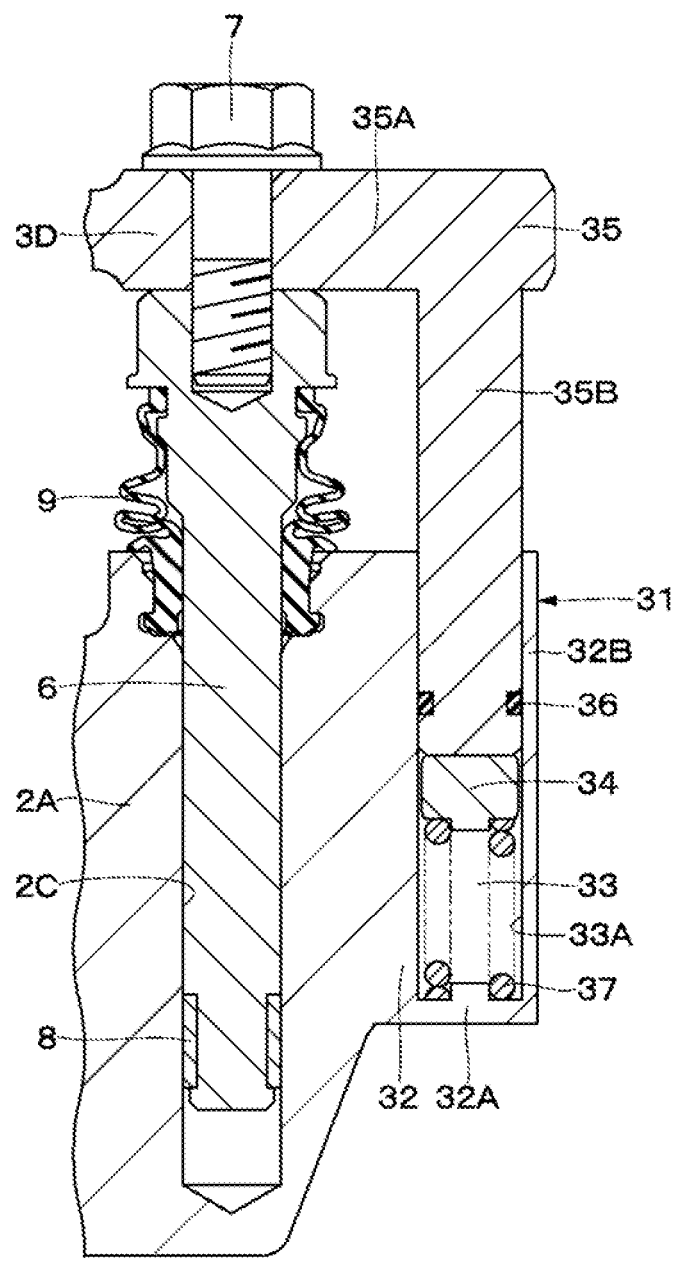
FIG. 6 is an enlarged sectional view showing an arm, a sliding pin, and a warning sound generating mechanism in FIG. 5.

FIGS. 5 and 6 show a third embodiment of the present invention. The third embodiment is characterized in that a warning sound generating mechanism is disposed at a position spaced from a pin hole of an arm in the rotational direction of the disk. It should be noted that, in the third embodiment, the same constituent elements as those of the first embodiment are denoted by the same reference numerals as those used in the first embodiment, and that a description thereof is omitted.

A warning sound generating mechanism 31 is provided in the arm 2A of the pair of arms 2A of the mounting member 2 that is located at the entrance side (rotation entrance side) of the rotational direction of the disk 1. The warning sound generating mechanism 31 is disposed at a position spaced from the pin hole 2C outward in the rotational direction of the disk 1. The warning sound generating mechanism 31 comprises a projecting portion 32, a hollow portion 33, a warning sound generating member 34, a projection 35, and a coil spring 37.

The projecting portion 32 is provided outside of the arm 2A in the rotational direction of the disk 1 to constitute a part of the arm 2A. The projecting portion 32 is formed in the shape of a bottomed cylinder having a hollow portion 33 therein and closed at the outer-side end thereof by a bottom portion 32A. The projecting portion 32 has an outer portion 33B having a thickness as small as possible so that a large warming sound can be generated when the warning sound generating member 34 collides with the outer portion 32B.

The hollow portion 33 is formed in the projecting portion 32. The hollow portion 33 is disposed in the arm 2A at a position different from the pin hole 2C in the rotational direction of the disk 1. That is, the hollow portion 33 extends in the axial direction of the disk 1 in parallel to the pin hole 2C and is closed at the outer-side end thereof by the bottom portion 32A. The hollow portion 33 is a space for warning sound generation in which a warning sound is generated by the collision of the warning sound generating member 34 with an inner wall 33A of the hollow portion 33.

The warning sound generating member 34 is movably provided in the hollow portion 33. The warning sound generating member 34 is a solid body made of a metal material, e.g. aluminum, or a rigid resin material, for example. The warning sound generating member 34 has an outer diameter set smaller than the bore diameter of the hollow portion 33. The projection 35 abuts against the inner-side end of the warning sound generating member 34, and the coil spring 37 is disposed at the outer-side end of the warning sound generating member 34.

When one brake of the vehicle is activated when the pads 10 have reached their wear limit, the projection 35 cancels pressing of the warning sound generating member 34 against the coil spring 37. Consequently, the warning sound generating member 34 is allowed to collide with the inner wall 33A of the hollow portion 33, thereby generating a warning sound.

The projection 35 projects from the caliper 3 toward the hollow portion 33. The projection 35 is movable in the axial direction of the disk 1, together with the caliper 3 and the sliding pin 6. The projection 35 is formed in an L-shape from a first extending portion 35A extending from the pin-mounting portion 3D of the caliper 3 outward in the rotational direction of the disk 1, and a second extending portion 35B extending from the distal end of the first extending portion 35A toward the hollow portion 33.

The second extending portion 35B extends in the axial direction of the disk 1 in parallel to the sliding pin 6. Consequently, the amount of displacement of the second extending portion 35B when the vehicle brake is activated has the same value as the amount of displacement of the sliding pin 6. A seal member 36 is provided between the second extending portion 35B and the inner wall 33A of the hollow portion 33 to restrain grease from flowing out toward the warning sound generating member 34.

The warning sound generating member 34 is disposed at the distal end of the second extending portion 35B. In this case, both when the vehicle brake is released and when the pads 10 have not worn out, the second extending portion 35B of the projection 33 holds the warning sound generating member 34 between itself and the coil spring 37 to restrain the warning sound generating member 34 from colliding with the inner wall 33A of the hollow portion 33.

On the other hand, when the vehicle brake is activated when the pads 10 have reached their wear limit, the second extending portion 35B of the projection 35 removes the restraint on the warning sound generating member 34, which has been imposed by the second extending portion 35B and the coil spring 37, thereby allowing the warning sound generating member 34 to collide with the inner wall 33A of the hollow portion 33.

The coil spring 37, which serves as a resilient member, is provided in the hollow portion 33 in abutment on the bottom portion 32A of the projecting portion 32. The coil spring 37 resiliently supports the warning sound generating member 34. The coil spring 37 has a spring constant set so large that the warning sound generating member 34 as resiliently supported by the coil spring 37 cannot collide with the inner wall 33A of the hollow portion 33 in response to vibration or the like of the vehicle body, and the spring constant of the coil spring 37 is set smaller than that of the return springs 5. Thus, it is possible to suppress generation of a warning sound when the pads 16 have not worn out and also possible to separate the pads 10 from the disk 1 stably when the vehicle brake is released.

Further, the coil spring 37 resiiientiy supports the warning sound generating member 34 between itself and the projection 33 tooth when the vehicle brake is released and when the pads 10 have not worn out, thereby restraining the warding sound generating member 34 from colliding with the inner wall 33A of the hollow portion 33.

Meanwhile, the coil spring 37 has a natural length corresponding to a length that the coil spring 37 has when the pads 10 have reached their wear limit. That is, when the vehicle brake is activated when the pads 10 have reached their wear limit, the coil spring 37 cancels the resilient support for the warning sound generating member 34, which has been provided by the coil spring 37 and the projection 35, thereby allowing the warning sound generating member 34 to collide with the inner wall 33A of the hollow portion 33.

Thus, with the warning sound generating mechanism 31 according to the third embodiment also, when the pads 10 have worn out, the warning sound generating member 34 can generate a warning sound by colliding with the inner wall 33A of the hollow portion 33. Therefore, the third embodiment can obtain the same advantages as those of the first embodiment.

Figure 7:
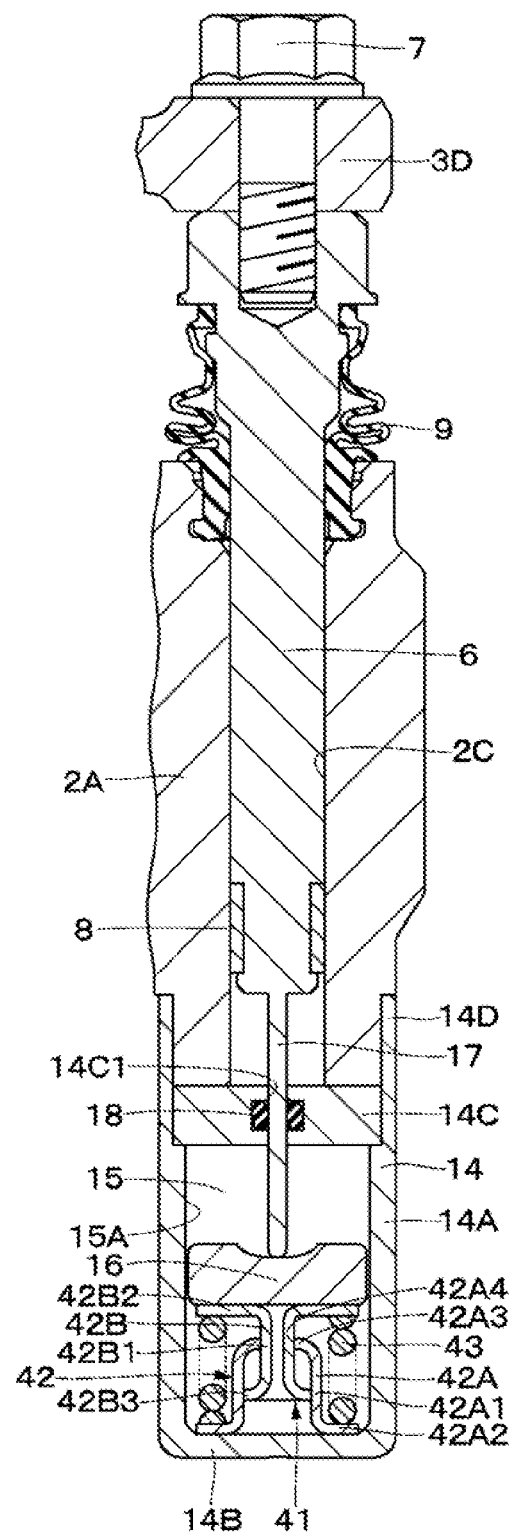
FIG. 7 is an enlarged sectional view showing an arm, a sliding pin, and a warning sound generating mechanism according to a fourth embodiment of the present invention.
Figure 8:
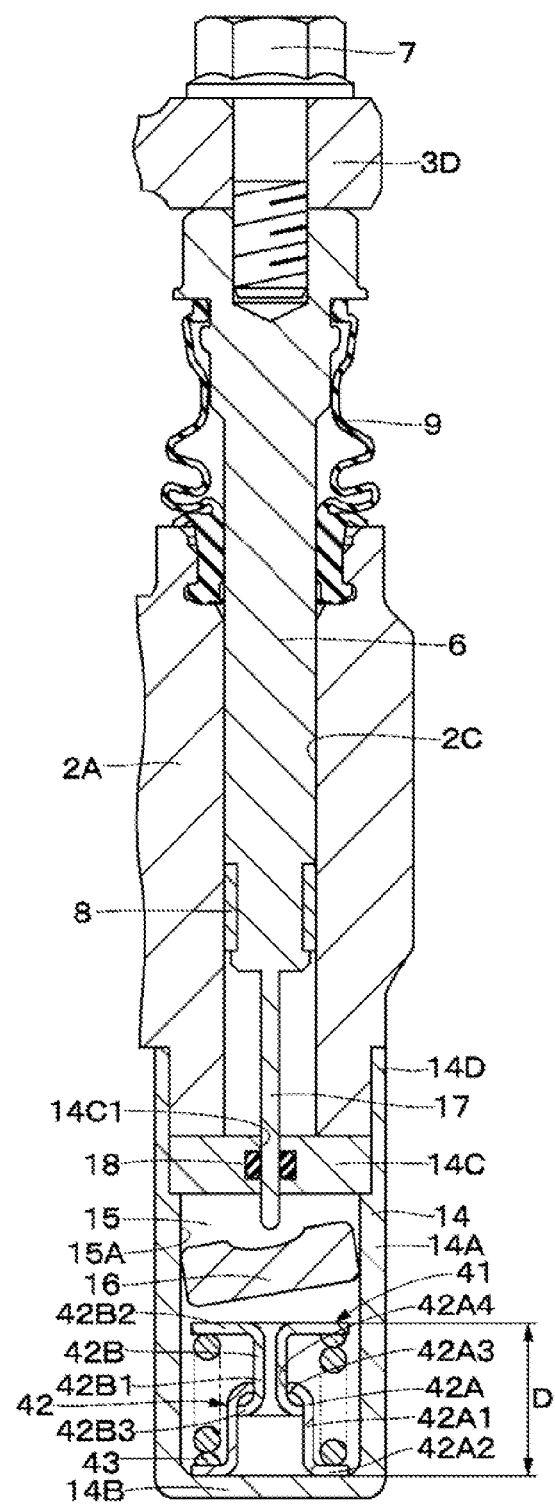
FIG. 8 is an enlarged sectional view showing the arm, the sliding pin, and the warning sound generating mechanism when the brake is activated in a state where the pads have worn out.
Figure 9:
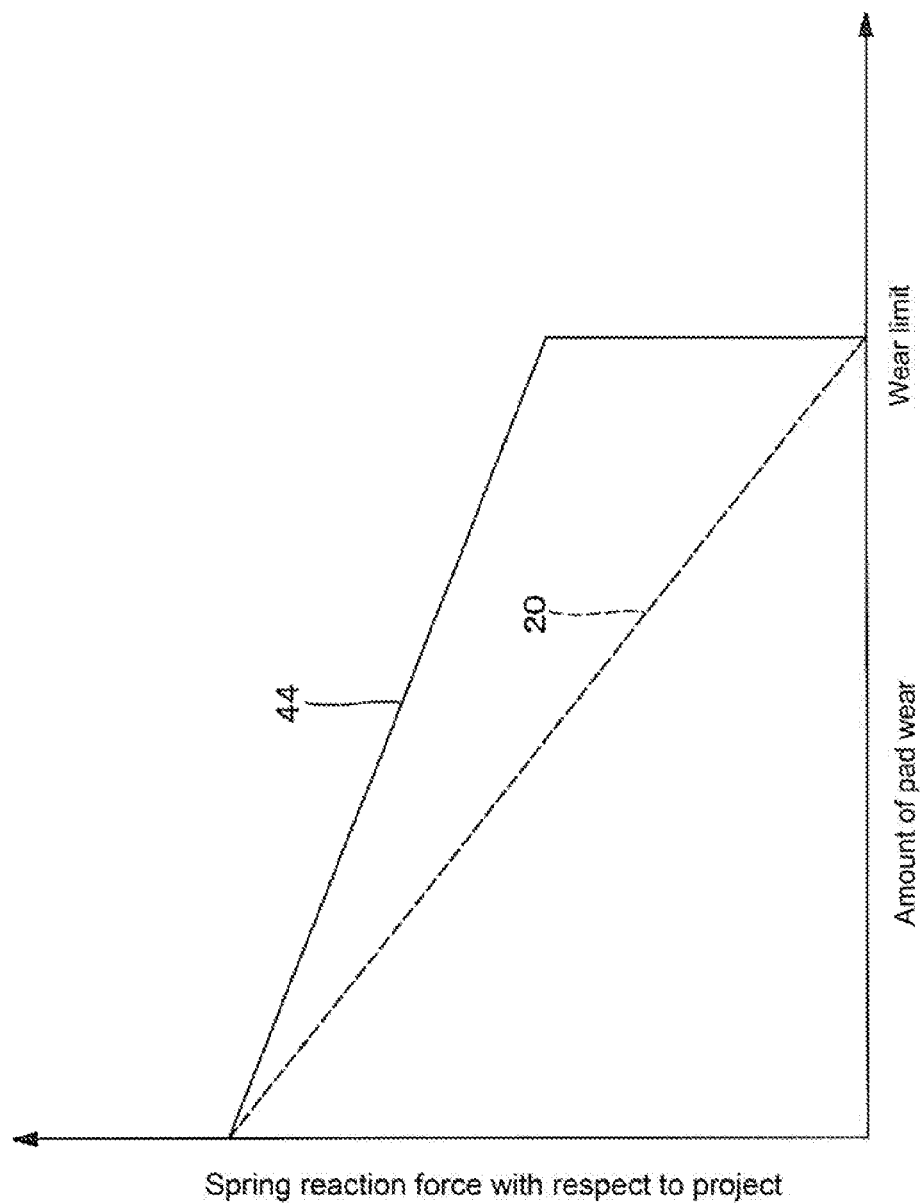
FIG. 9 is a characteristic diagram showing the spring characteristics of a coil spring and a restricted spring.

FIGS. 7 to 9 show a fourth embodiment of the present invention. The fourth embodiment is characterized by using a restricted spring having a spring length restricted to a predetermined length as a resilient member of a warning sound generating mechanism. If should be noted that, in the fourth embodiment, the same constituent elements as those of the first embodiment are denoted by the same reference numerals as those used in the first embodiment, and that a description thereof is omitted.

A restricted spring 41 serving as a resilient member is used, in place of the coil spring 19 in the first embodiment. The restricted spring 41 comprises a spring retainer 42 provided in the hollow portion 15 at a bottom portion 14B of the latter, and a coil spring 43 fitted to the spring retainer 42. The spring retainer 42 restricts the extension of the coil spring 43 when extending before the natural length thereof is reached. That is, the spring retainer 42 restricts the maximum extension of the coil spring 43.

The spring retainer 42 comprises an outer-side spring retainer member 42A and an inner-side spring retainer member 42B. The outer-side spring retainer member 42A comprises an outer cylindrical portion 42A1 extending in the hollow portion 15 in the axial direction of the disk 1, a bottom plate portion 42A2 extending outward from the outer-side end of the outer cylindrical portion 42A1 and fixed to the bottom portion 14B, and a bent portion 42A3 bent inward from the inner-side end of the outer cylindrical portion 42A1. The center of the bent portion 42A3 is provided with a through-hole 42A4 through which an inner cylindrical portion 4B of the inner-side spring retainer member 42B extends.

The inner-side spring retainer member 42B comprises an inner cylindrical portion 42B1 located inside the outer cylindrical portion 42A1 of the outer-side spring retainer member 42A and projecting from the through-hole 42A4 toward the warning sound generating member 16, an abutting plate portion 42B2 extending outward from the inner-side end of the inner cylindrical portion 42B1 and abutted by the warning sound generating member 16, and a flange portion 42B3 located inside the outer cylindrical portion 42A1 of the outer-side spring retainer member 42A and extending toward the outer cylindrical portion 42A1 from the outer-side end of the inner cylindrical portion 42B1.

The coil spring 43 is provided outside the outer cylindrical portion 42A1 of the outer-side spring retainer member 42A to extend between the bottom plate portion 42A2 of the outer-side spring retainer member 42A and the abutting plate portion 42B2 of the inner-side spring retainer member 41B. In this case, the coil spring 4 is being urged at all times between the bottom plate portion 42A2 of the outer-side spring retainer member 42A and the abutting plate portion 42B2 of the inner-side spring retainer member 42B.

That is, when the coil spring 43 extends, the inner cylindrical portion 42B1 or the inner-side spring retainer member 42B projects from the through-hole 42A4 of the outer-side spring retainer member 42A. The flange portion 42B3 of the inner-side spring retainer member 42B and the bent portion 42A3, of the outer-side spring retainer member 42A abut against each other before the coil spring 43 reaches its natural length to restrict the coil spring 43 from extending further. Thus, the maximum length D of the restricted spring 41 is shorter than the natural length of the coil spring 43.

The maximum length D of the restricted spring 41 corresponds to a length that the restricted spring 41 has when the pads 10 have reached their wear limit. That is, when the vehicle brake is activated when the pads 10 have reached their wear limit, the restricted spring 41 cancels the resilient support for the warning sound generating member 16, which has been provided by the restricted spring 41 and the projection 17, thereby allowing the warning sound generating member 16 to collide with the inner wall 15A of the hollow portion 15.

In this case, as shown by the characteristics 44 of the restricted spring 41, which is represented by the solid line in FIG. 9, the spring reaction force of the restricted spring 41 with respect to the projection 17 can be made larger than the spring reaction force (characteristics 20 represented by the dotted line in FIG. 9) of the coil spring 19, which is used in the first embodiment, until the pads 10 reach their wear limit.

Accordingly, the restricted spring 41 can be adjusted so that the required spring reaction force can be obtained even when the pads 10 are approaching their wear limit.

Thus, with the fourth embodiment also, when the pads 10 have worn out, the warning sound generating member 16 can generate a warning sound by colliding with the inner wall 15A of the hollow portion 15. Therefore, the fourth embodiment can obtain the same advantages as those of the first embodiment.

Figure 10:
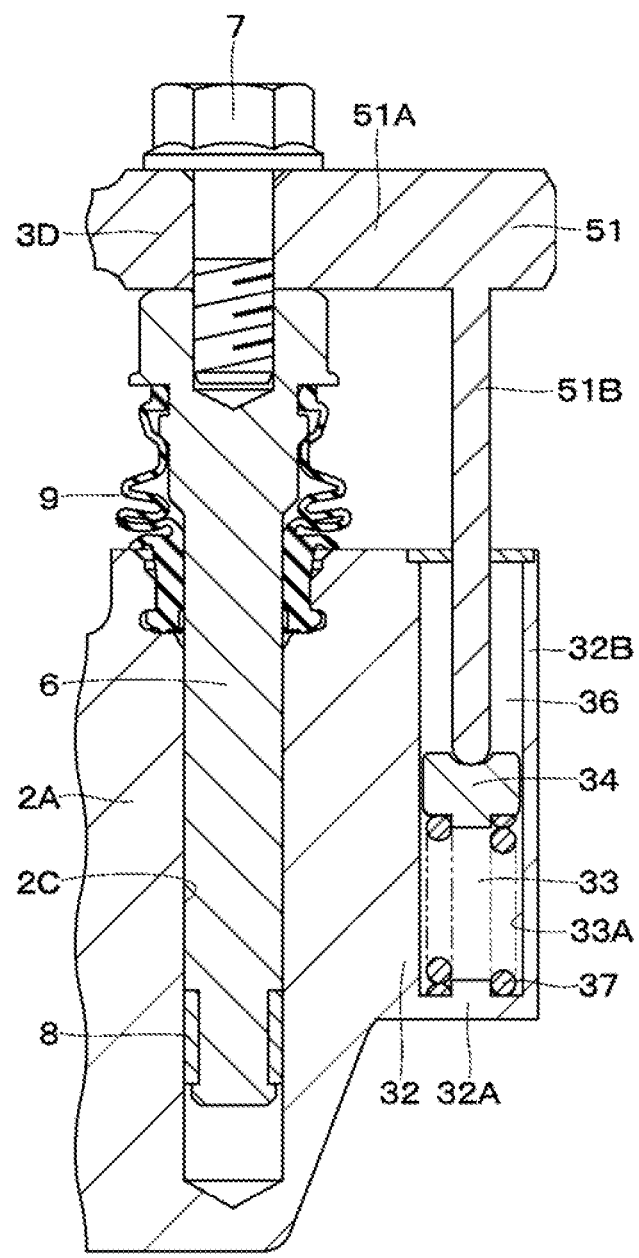
FIG. 10 is an enlarged sectional view showing an arm, a sliding pin, and a warning sound generating mechanism according to a first modification of the present invention.

It should be noted that, in the third embodiment, the present invention has been explained by way of an example in which the seal member 36 is provided around the second extending portion 35B of the projection 35. However, the present invention is not limited thereto. For example, the present invention may be arranged as in a first modification shown in FIG. 10. That is, a projection 51 is configured to comprise a first extending portion 51A and a second extending portion 51B, and the outer diameter of the second extending portion 51B is set slightly smaller than the bore diameter of the hollow portion 33, thereby eliminating the need to provide a seal member.

Figure 11:
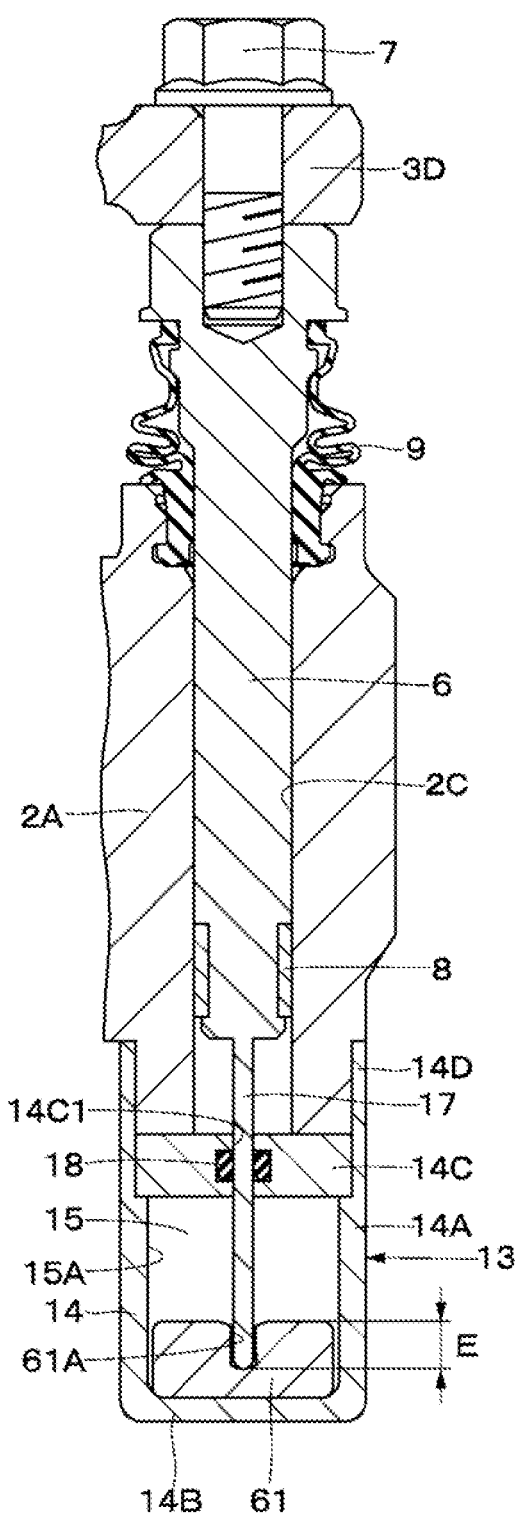
FIG. 11 is an enlarged sectional view showing an arm, a sliding pin, and a warning sound generating mechanism according to a second modification of the present invention.

Further, in the first embodiment, the present invention has been explained by way of an example in which the warning sound generating member 16 is held between the projection 17 and the coil spring 19. However, the present invention is not limited thereto. For example, the present invention may toe arranged as in a second modification shown in FIG. 11. That is, the center of a warning sound generating member 61 is provided with a recess 61A into which the distal end of the projection 17 is movably fittable. In this case, the depth E of the recess 61A is set to a length corresponding to the wear limit of the pads 10. That is, when the pads 10 have reached their wear limit, the distal end of the projection 17 comes out of the recess 61A, thereby allowing the warning sound generating member 61 to collide with the inner wall 15A of the hollow portion 15. This structure is similarly applicable to the third embodiment and the first modification.

Further, in the first embodiment, the present invention has been explained by way of an example in which the warning sound generating mechanism 13 is provided in the arm 2A of the pair of arms 2A of the mounting member 2 that is located at the rotation entrance side of the disk 1. However, the present invention is not limited thereto. For example, the warning sound generating mechanism may be provided in the arm 2A located at the exit side (rotation exit side) of the rotational direction of the disk 1. Alternatively, the warning sound generating mechanism may be provided in each arm 2A. These structures are similarly applicable to the second, third and fourth embodiments and the first and second modifications.

Further, in the first embodiment, the present invention has been explained by way of an example in which the coil spring 19 is used as a resilient member. However, the present invention is not limited thereto. For example, a rubber spring, an air spring, or other spring member may also be used as a resilient member to resiliently support the warning sound generating member. This structure is similarly applicable to the second, third and fourth embodiments and the first modification.

Further, it may be said that the mounting member has a warning sound generating mechanism that generates a warning sound for wear detection according to relative movement of the mounting member and the caliper when the pads have worn by a predetermined amount.

The following is a description of an invention included in the first, second and fourth embodiments. According to this invention, the warning sound generating mechanism is disposed at a position spaced from a pin hole in the direction of movement of a sliding pin sliding in the pin hole and configured to generate a warning sound when the amount of displacement of the sliding pin relative to the arm reaches a predetermined amount of displacement from the position of the sliding pin when the pads are new, as a result of wearing of the pads. With this structure, the warning sound generating mechanism can be disposed at a position spaced from the pin hole in the direction of movement of the sliding pin sliding in the pin hole.

Further, the warning sound generating mechanism comprises a hollow portion provided in the arm at a position different from the pin hole in the direction of movement of the sliding pin, a warning sound, generating member movably provided in the hollow portion to generate a warning sound, by colliding with the inner wall of the hollow portion, and a projection projecting from the sliding pin toward the hollow portion and configured such that when the amount of displacement or the sliding pin has not yet reacted a predetermined amount of displacement, the projection restrains the warning sound generating member from colliding with the inner wall of the hollow portion, and when the amount of displacement of the sliding pin has reached the predetermined amount of displacement, the projection allows the warning sound generating member to collide with the inner wall. With this structure, the wear of the pads can be detected with a warning sound generated by the collision of the warning sound generating member with the inner wall of the hollow portion.

The following is a description of an invention included in the third embodiment. According to this invention, the warning sound generating mechanism is disposed at a position spaced from the pin hole in the rotational direction of the disk and configured to generate a warning sound when the amount of displacement of the sliding pin relative to the arm reaches a predetermined amount of displacement from the position of the sliding pin when the pads are new, as a result of wearing of the pads. With this structure, the warning sound generating mechanism can be disposed at a position spaced from the pin hole in the rotational direction of the disk.

Further, the warning sound generating mechanism comprises a hollow portion provided in the arm at a position different from the pin hole in the rotational direction of the disk, a warning sound generating member movably provided in the hollow portion and configured to generate a warning sound by colliding with the inner wall of the hollow portion, and a projection projecting from the caliper toward the hollow portion and configured such that when the amount of displacement of the sliding pin has not yet reached a predetermined amount of displacement, the projection restrains the warning sound generating member from colliding with the inner wall of the hollow portion, and when the amount of displacement of the sliding pin has reached the predetermined amount of displacement, the projection allows the warning sound generating member to collide with the inner wall. With this structure, the wear of the pads can be detected with a warning sound generated by the collision of the warning sound generating member with the inner wall of the hollow portion.

The following is a description of an invention included in each of the embodiments. According to this invention, the warning sound generating mechanism includes a resilient member disposed in the hollow portion and configured to resiiientiy support the warning sound generating member between the resilient member and the projection when the amount of displacement of the sliding pin has not yet reached a predetermined amount or displacement, thereby restraining the warning sound generating member from colliding with the inner wall of the hollow portion. The resilient member cancels the resilient support for the warning sound generating member, which has been provided by the resilient member and the projection, when the amount of displacement of the sliding pin has reached the predetermined amount of displacement, thereby allowing the warning sound generating member to collide with the inner wall. With this structure, when the pads have worn out so that the amount of displacement of the projection and the sliding pin has become large, the resilient member cancels the resilient support for the warning sound generating member, which has been provided by the resilient member and the projection, thereby allowing the warning sound generating member to collide with the inner wall, and thus enabling detection of the wear of the pads.

The disk brake according to each of the embodiments includes a mounting member having a pair of arms formed to extend over the outer periphery of a disk, the mounting member being secured to a non-rotating part of a vehicle, a caliper provided on the mounting member movably in the axial direction of the disk, and a pair of pads movably attached to the mounting member and pressed against the opposite sides, respectively, of the disk by the caliper. The mounting member is provided with a warning sound generating mechanism generating a warning sound for wear detection according to relative movement of the mounting member and the caliper when the pads have worn by a predetermined amount. Thus, it is possible to provide a disk brake capable of informing the driver of the wear of the pads at a reduced cost.

LIST OF REFERENCE SIGNS

1: disk
2: mounting member
2A: arm
2C: pin hole
3: caliper
6: sliding pin
10: pad
13, 21, 31: warning sound generating mechanism
15, 33: hollow portion
15A: inner wall
16, 34, 61: warning sound generating member
17, 35, 51: projection
19, 24, 37: coil spring (resilient member)
22: inner-side warning sound generating member (warning sound generating member)
23: outer-side warning sound generating member (warning sound generating member)
25: granular warning sound generating member
41: restricted spring (resilient member)

The invention claimed is:

1. A disk brake comprising:
a mounting member having a pair of arms formed to extend over an outer periphery of a disk, the mounting member being secured to a non-rotating part of a vehicle;
a caliper provided on the mounting member movably in an axial direction of the disk;
a pair of pin holes provided in the arms, respectively, of the mounting member to extend in the axial direction of the disk;
a pair of sliding pins provided at opposite ends of the caliper to slide in the pin holes, respectively; and
a pair of pads movably attached to the mounting member and pressed against opposite sides, respectively, of the disk by the caliper;
wherein at least one arm of the arms of the mounting member is provided with a warning sound generating mechanism generating a warning sound for wear detection according to displacement of the sliding pin relative to the at least one arm when the pads have worn by a predetermined amount, and
wherein the warning sound generating mechanism generates a collision sound as the warning sound by setting a warning sound generating member in a hollow portion of the at least one arm so that the warning sound generating member is movable therein.

2. The disk brake of claim 1, wherein the warning sound generating mechanism is disposed at a position spaced from the pin hole in a direction of movement of the sliding pin sliding in the pin hole, the warning sound generating mechanism being configured to generate the warning sound when an amount of displacement of the sliding pin relative to the arm has become a predetermined amount of displacement from a position of the sliding pin when the pads are new, as a result of wearing of the pads.

3. The disk brake of claim 2,
wherein the portion is provided at a position different from the pin hole in the direction of movement of the sliding pin,
the warning sound generating member is configured to generate the warning sound by colliding with an inner wall of the hollow portion,
wherein the warning sound generating mechanism further includes:
a projection projecting from the sliding pin toward the hollow portion, the projection being configured such that when the amount of displacement of the sliding pin has not yet reached the predetermined amount of displacement, the projection restrains the warning sound generating member from colliding with the inner wall of the hollow portion, and when the amount of displacement of the sliding pin has reached the predetermined amount of displacement, the projection allows the warning sound generating member to collide with the inner wall.

4. The disk brake of claim 1, wherein the warning sound generating mechanism is disposed at a position spaced from the pin hole in a rotational direction of the disk, the warning sound generating mechanism being configured to generate the warning sound when an amount of displacement of the sliding pin relative to the arm has reached a predetermined amount of displacement from a position of the sliding pin when the pads are new, as a result of wearing of the pads.

5. The disk brake of claim 4, wherein
wherein the hollow portion is provided at a position different from the pin hole in the rotational direction of the disk,
the warning sound generating member is configured to generate the warning sound by colliding with an inner wall of the hollow portion,
the warning sound generating mechanism further includes:
a projection projecting from the caliper toward the hollow portion, the projection being configured such that when the amount of displacement of the sliding pin has not yet reached the predetermined amount of displacement, the projection restrains the warning sound generating member from colliding with the inner wall of the hollow portion, and when the amount of displacement of the sliding pin has reached the predetermined amount of displacement, the projection allows the warning sound generating member to collide with the inner wall.

6. The disk brake of claim 3, wherein the warning sound generating mechanism further includes a resilient member disposed in the hollow portion, the resilient member being configured to resiliently support the warning sound generating member between the resilient member and the projection when the amount of displacement of the sliding pin has not reached the predetermined amount of displacement, thereby restraining the warning sound generating member from colliding with the inner wall of the hollow portion;

the resilient member being configured such that when the amount of displacement of the sliding pin has reached the predetermined amount of displacement, the resilient member cancels resilient support for the warning sound generating member, which has been provided by the resilient member and the projection, thereby allowing the warning sound generating member to collide with the inner wall.

7. The disk brake of claim 5, wherein the warning sound generating mechanism further includes:

a resilient member disposed in the hollow portion, the resilient member being configured to resiliently support the warning sound generating member between the resilient member and the projection when the amount of displacement of the sliding pin has not reached the predetermined amount of displacement, thereby restraining the warning sound generating member from colliding with the inner wall of the hollow portion;

the resilient member being configured such that when the amount of displacement of the sliding pin has reached the predetermined amount of displacement, the resilient member cancels resilient support for the warning sound generating member, which has been provided by the resilient member and the projection, thereby allowing the warning sound generating member to collide with the inner wall.

* * * * *